United States Patent
Kobilka et al.

(10) Patent No.: US 11,111,398 B2
(45) Date of Patent: Sep. 7, 2021

(54) SUBSURFACE MODIFIED SILICA MATERIALS

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 15/403,361

(22) Filed: Jan. 11, 2017

(65) Prior Publication Data

US 2018/0194953 A1   Jul. 12, 2018

(51) Int. Cl.
*C09C 1/30* (2006.01)
*C09D 7/62* (2018.01)
*C09D 7/40* (2018.01)

(52) U.S. Cl.
CPC .............. *C09D 7/62* (2018.01); *C09C 1/3081* (2013.01); *C09D 7/67* (2018.01); *C09D 7/68* (2018.01); *C09D 7/69* (2018.01); *C01P 2004/64* (2013.01); *C01P 2006/42* (2013.01)

(58) Field of Classification Search
CPC ...... C09D 7/62; C09C 1/3081; C08G 77/458; C08G 77/46
See application file for complete search history.

(56) References Cited

U.S. PATENT DOCUMENTS

| | | | |
|---|---|---|---|
| 5,248,752 A * | 9/1993 | Argyropoulos | C07C 271/20 528/49 |
| 6,020,026 A | 2/2000 | Birch et al. | |
| 6,410,149 B1 | 6/2002 | Hendricks et al. | |
| 6,855,759 B2 | 2/2005 | Kudo et al. | |
| 7,645,828 B2 | 1/2010 | Jin et al. | |
| 8,879,275 B2 * | 11/2014 | Boday | C07F 9/5022 361/760 |
| 9,266,772 B2 | 2/2016 | Cadet et al. | |
| 9,345,667 B2 | 5/2016 | Kong et al. | |
| 2009/0294726 A1 * | 12/2009 | Hamada | H01B 3/10 252/182.12 |
| 2010/0062539 A1 | 3/2010 | Frederick et al. | |
| 2015/0274538 A1 | 10/2015 | Yuan et al. | |

FOREIGN PATENT DOCUMENTS

| | | |
|---|---|---|
| CN | 102745696 A | 10/2012 |
| EP | 0172579 B1 | 2/1986 |

OTHER PUBLICATIONS

Rahman et al., Synthesis of Silica Nanoparticles by Sol-Gel : Size-Dependent Properties, Surface Modification, and Applications in Silica-Polymer Nanocomposites—A Review, 2012, Journal of Nanomaterials, vol. 2012, Article ID 132424, pp. 1-15 (Year: 2012).*

* cited by examiner

*Primary Examiner* — Elizabeth A Robinson
(74) *Attorney, Agent, or Firm* — Patterson + Sheridan, LLP

(57) ABSTRACT

Methods and compositions related to subsurface modified silica materials are described. The silica materials include silicon- and carbon-containing groups covalently bonded to the silicon-oxygen matrix. The silica materials have tunable permeability, modulus, hardness, flexibility, and elongation. The silica materials are suitable for use as polymer fillers and as functional coatings.

16 Claims, 3 Drawing Sheets

SUBSURFACE MODIFIED SILICA MATERIALS

FIELD

The present disclosure describes methods and compositions related to modified silica materials with tunable properties.

BACKGROUND

Silica materials are used for a variety of applications including protective coatings, paints, paint primers, adhesives, plastics, cosmetics, greases, and in biomedical applications. Adjusting and tuning the hydrophilic/lipophilic balance of the preformed silica materials by hydrophobic modification has an impact on their barrier properties, adhesion, mixing, and dispersion, and thus enables their use in the aforementioned applications. The primary method for the production of the hydrophobically-modified silica materials is by reaction of silica surface silanol group(s), such as Si—OH groups exposed at the surface of a silica body, with hydrolyzable organosilane coupling agents (e.g. R3Si—OR, where R is an organic group, and —OR is a hydrolyzable group), to produce new surface groups such as Si—OR. Typically the R group is an aromatic or aliphatic group and it imparts surface hydrophobicity and/or oleophilicity to the surface of the silica material. The change in the surface properties may be manifested in a change in surface energy and/or surface wetting, which may be measured by a contact angle experiment. Addition of organic groups and hydrophobicity below the silica material surface (subsurface) is difficult due to a lack of diffusion and penetration of silane coupling agents (and other reagents) below the silica surface. This is because of steric restraints and repulsive forces, and the tortuous path the reagents must take to find and react with the internal silanol groups. Subsurface modification of silica materials would therefore be beneficial and would enable tuning of properties such as permeability, modulus, hardness, flexibility, and elongation.

SUMMARY

Described herein is an electronic article that has a substrate with electronic components; and a coating that is disposed on the substrate that contains silica particles with subsurface organic groups. The electronic article further contains silica particles that are nanoparticles, and the nanoparticles have a diameter from 1 nm to 100 nm. The crosslinked silica particles can serve as foci for coating crosslinks. The silica particles have a diameter from 101 nm to 100 microns, and can be found at a concentration in the coating from 0.01 wt % to 5 wt %. The coating of this disclosure has a thickness from 1 nm to 10 microns, and is a selective permeant barrier coating, that can form a reaction product with a permeant, such as a sulfur compound. The sulfur compound is selected from the group consisting of: elemental sulfur, inorganic sulfur compounds, hydrogen sulfides, sulfur oxides, organic sulfur compounds, thiols, and alkane thiols.

This disclosure also describes a method for producing subsurface modified silica particles that involves: forming a first solution of aqueous ammonia; forming a second solution comprising an organic ester of a silicic acid, an alcohol, and a multifunctional bridging organosilane compound; adding the first solution to the second solution to form a third solution; stirring the third solution for at least one hour to produce a suspension of silica particles; and isolating the silica particles. The method uses an organic ester of silicic acid that is an alkyl ester, and the alkyl ester of silicic acid can be tetraethyl orthosilicate. The method also uses a multifunctional bridging organosilane compound that has a formula $R_3Si-R-SiR_3$, and wherein at least two terminal R groups are —OR' groups, and R' is an organic group. The silica particles have subsurface groups with —Si—R—Si— linkages, and R is an organic group. The silica particles of this method are nanoparticles, and the nanoparticles have a diameter from 10 nm to 100 nm. The method also provides silica particles that have a diameter from 0.101 microns to 10 microns. The silica particles of this method are monodisperse, or they may be crosslinked.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

In this disclosure, we present compositions and methods for the preparation of subsurface hydrophobic silica materials (SHSMs) that display new and desirable bulk properties such as tunable permeability, modulus, hardness, flexibility, and elongation. The SHSMs may be used as is or neat in a variety of applications such as a filler in polymers. The SHSMs of this disclosure contain covalently bonded subsurface organic groups (R groups) that are at least 1 nm below the silica body surface. The subsurface R groups are covalently bonded within the silica matrix or network, and are not restricted to the surface of the silica material (e.g., surface silanol groups) but may be disposed throughout the silica matrix. The structure, bonding, and atomic arrangements of the R groups are not restricted in this disclosure, and may include structures that are linear, branched, cyclic, dendritic, oligomeric, or polymeric in nature. The subsurface R groups may be any organic group, such as an alkyl group and/or aromatic group, and the organic groups may further contain or be a portion of another chemical group or functionality, including, but not restricted to: polyolefin, polysiloxane, polyurethane, and polyether groups. The R groups may be pendant groups or main chain groups, or may contain pendant groups or main chain groups. The organic R groups may also contain other atoms and/or chemical functionalities that are inorganic. In some embodiments, the R group may be part of a multifunctional bridging organosilane compound used to prepare an SHSM, and the bridging organosilane compound may have a formula $R_3Si-R-SiR_3$, and wherein at least one end or terminal R group is a hydrolyzable —OR' group(s) (e.g., alkoxy). In some embodiments, the subsurface R groups may be chemically reactive or chemically inert, or both, and may react with, capture, or bind a permeant, such as a gas or a liquid. In other embodiments, the subsurface organic groups may allow the passage of a permeant.

In addition to subsurface R groups, the surface of an SHSM may also contain non-polar or semi-polar alkoxy groups or other organic R groups that further define the hydrophobic/hydrophilic character of the material. The surface R groups may be chemically reactive or inert. In some embodiments, surface R groups may be involved in cross-linking reactions that bind SHSM nanoparticles together. The subsurface or surface R groups are not limited, and therefore enable the construction of SHSMs with variable gas permeability, flexibility, elongation, hydrophobicity, modulus, density, porosity, and dielectric constant.

Preparation of the new SHSMs may be achieved by judicious choice and incorporation of bridging R groups within the silica matrix by a "bottom-up" approach. In embodiments of this disclosure, monodisperse, or non-agglomerated SHSM particles or spheres with diameters between about 10 nm to about 100 nm may be produced by means of a hydrolysis reaction as illustrated in FIG. 1.

Figure 1:
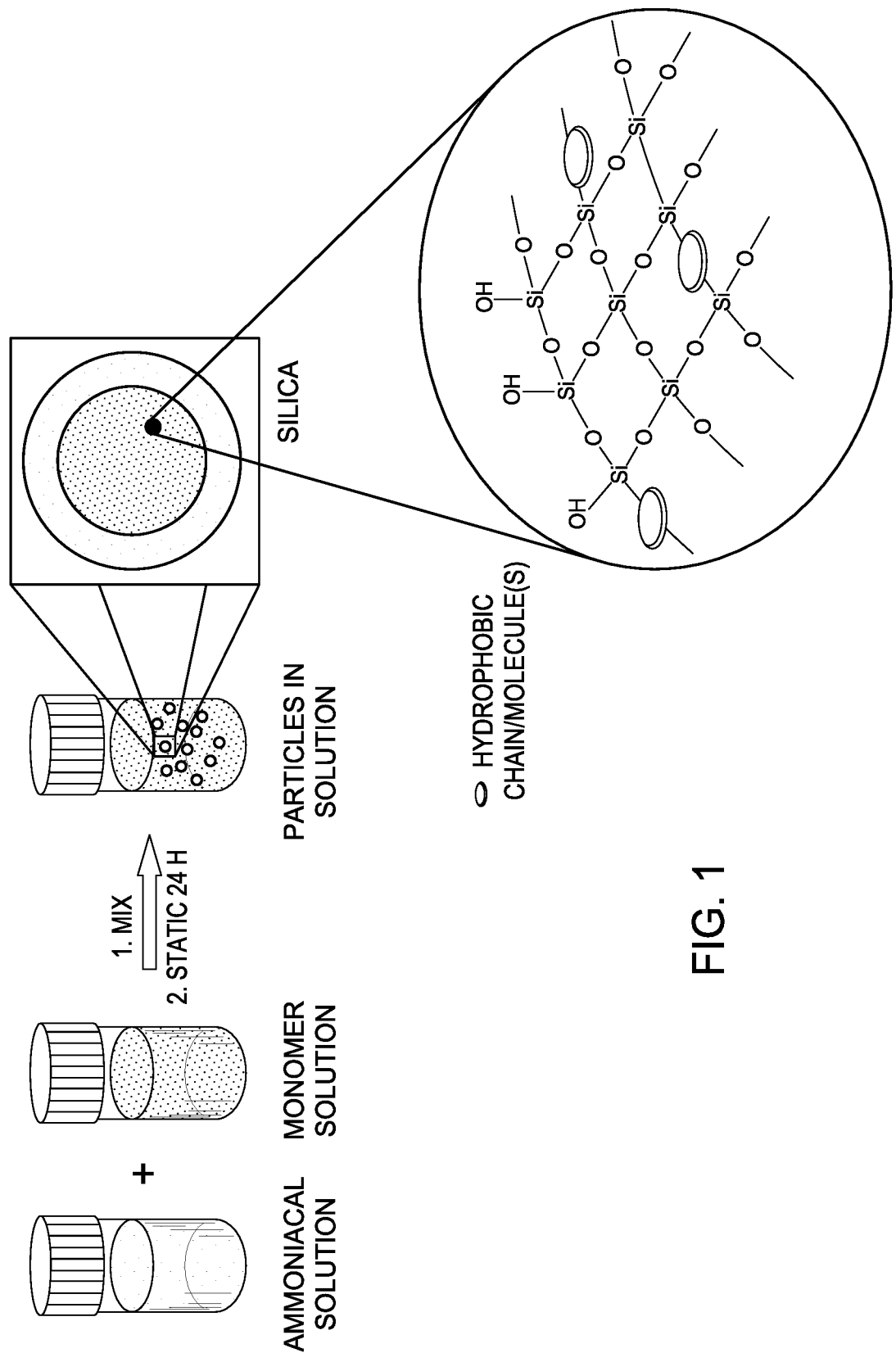
FIG. 1 is a schematic reaction diagram according to one embodiment.

FIG. 1 is a schematic reaction diagram illustrating the formation of SHSM particles with a silica network that contains covalently bonded R groups that bridge portions of the —Si—O—Si— silica network, and thus create a sub-surface modified silica particle with bridging —Si—R—Si— linkages. In the reaction of FIG. 1, an ammoniacal solution and a monomer solution are combined to form a reaction mixture that results in particles in a solution. A schematic diagram of one of the particles is shown, labelled "silica," and a sub-surface region of the particle is schematically shown magnified to the atomic level. The atomic level detail shows a silicon-oxygen matrix with bridge groups covalently incorporated into the silicon-oxygen matrix. The bridge groups, schematically represented in FIG. 1 as disc-shaped objects, are the R groups described herein, and are generally distributed through the bulk of the silicon-oxygen matrix according to the proportion of bridging compound included in the reaction mixture, as further described below. At or near the surface of the silica particle, residual silanol groups may terminate the surface, or a portion thereof. In this way, a "bottom-up" approach to including R groups in the bulk of the silica particle relies on incremental reaction of a bridging compound with the growing silicon-oxygen matrix.

SHSM nanoparticles may be prepared using alkaline hydrolysis conditions using a suitable base, such as an aqueous amine, for example an aqueous alkyl amine solution such as methylamine in water, or an aqueous ammonia solution. In one embodiment, and in relation to FIG. 1, SHSM nanoparticles may be prepared as follows: 30 mL of ethanol, 20 mL of water, and 3.0 mL of 28% by weight ammonium hydroxide (aqueous ammonia) may be mixed with about 1.5 mL of tetraethyl orthosilicate (TEOS, an ethyl ester of silicic acid) and an amount of a multifunctional bridging organosilane compound or reagent (e.g., 1,2-bis (triethoxysilyl)hexane) in a glass vial. The solution may then be stirred from between about 1 hour to about 48 hours, such as 24 hours, at about 23° C., to form a homogeneous solution. The formation of the monodisperse SHSM silica spherical particles containing subsurface R groups may be evidenced by the appearance of a faint blue color in the reaction medium. Monodisperse particles are primary, substantially non-agglomerated particles. Those skilled in the art may vary the concentrations of the components (e.g., increase or decrease the amount of water) to achieve the target SHSM particle size and R group content. For example, a molar range for the multifunctional bridging organosilane compound may be between about 0.1 mole % to about 1 mole %, such as 1 mole percent or less, based on the ester of silicic acid, (e.g., TEOS). The characterization of the SHSM particles may be carried out by removal of solvent in vacuo and drying the SHSM particles in an oven, from about 40° C. to about 120° C., followed by transmission electron microscopy (TEM) and dynamic light scattering (DLS) experiments. One example of a useful TEM instrument is a JEOL JEM-200CX transmission electron microscope. DLS measurements may be performed using a Malvern Zetasizer Nano ZSP instrument to obtain the hydrodynamic size of the particles.

In another embodiment, monodisperse fluorescent silica nanoparticles, which may be nanospheres (1 to 100 nm), with subsurface organic R groups, are prepared. Fluorescent silica nanoparticles offer potential for many applications in applied research such as cellular studies, high-resolution microscopies, drug delivery, and sensing. Current optical labels typically span the microscale range and/or suffer from limited optical performance and versatility. In one embodiment, fluorescent silica nanoparticles with subsurface R groups may be prepared as follows: 2 M aqueous ammonia and water are added to a glass vial to generate an ammoniacal or ammonia solution. To a second vial, tetraethyl orthosilicate (TEOS), 200 proof ethanol, and a multifunctional bridging organosilane compound (<1.0 mole %) may be added to generate a monomer solution. Next, the ammonia solution may be added to the monomer solution and stirred vigorously for about 24 hours. Particles may then be centrifuged, washed, and dried to remove any unreacted silane. Next, the particles may be redispersed in a solvent, and a fluorescent surface modifier or coupling agent (e.g., dansyl chloride) may be added, and the solution may be stirred for about 3 hours. Particles may then be centrifuged, washed, and dried to yield fluorescent SHSM nanoparticles containing surface fluorescent R groups. In one embodiment, the bridging R group of the multifunctional bridging organosilane compound is a fluorescent group. Florescence response of the particles may be analyzed using a detector such as a 1260 Infinity II Fluorescence Detector made by Agilent Technologies of Santa Clara, Calif. USA. The materials used to prepare and/or synthesize the chemical compounds and materials described herein are available from a number of sources, including Gelest Incorporated of Morrisville, Pa., USA, and Sigma-Aldrich Chemical Company, of St. Louis, Mo., USA.

As described prior, synthesis of SHSM silica spheres or particles containing subsurface R groups may utilize a multifunctional bridging organosilane compound ($X_3Si$—R—$SiX_3$), where at least two X groups are alkoxy groups at the distal or terminal end(s) of the molecule or compound. Preparation of such a bridging agent is shown in reaction example 1.

REACTION EXAMPLE 1

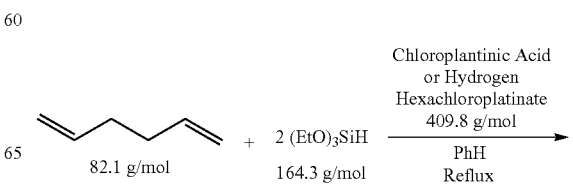

-continued

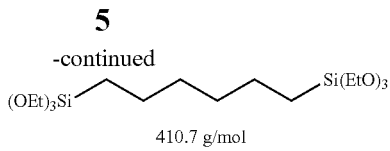

410.7 g/mol

As shown, in reaction example 1, an alkyl diene may undergo a hydrosilylation reaction with triethoxysilane to produce a hexafunctional bridging organosilane compound (e.g., 1,2-bis(triethoxysilyl)hexane). As mentioned prior, the multifunctional bridging organosilane compound may be generalized in the following formula: $R_3Si-R-SiR_3$, and wherein at least two end or terminal R groups are —OR' groups that serve as bonding sites for bridge formation, and R is a group containing carbon. It should be noted that the R groups in one molecule may be the same or different in any combination.

In one embodiment, per reaction example 1, 1,5-hexadiene (41 g, 0.5 mol), triethoxysilane (205 g, 1.25 mol), and anhydrous benzene (200 mL, (PhH)) may be combined in an oven-dried, two-necked, round-bottom flask (1 L) equipped with a condenser, drying tube, and a magnetic stir bar, under dry air. To this colorless, transparent solution, red-orange crystals of chloroplatinic acid (204 mg, 0.5 mmol) are added. Alternatively, hydrogen hexachloroplatinate may be used. The mixture may then be allowed to stir under air at about 23° C. for about 30 minutes, and the solution may become slightly yellow. The reaction may then be warmed and refluxed under dry air or a dry, inert gas (e.g., nitrogen) for about 2 hours. After reflux, the benzene solvent, unreacted 1,5-hexadiene, and unreacted triethoxysilane can be removed in vacuo. The remaining oil (1,2-bis(triethoxysilyl) hexane product) may be distilled under vacuum, followed by redistillation to remove undesirable by-products or starting material(s). The materials used to prepare and/or synthesize the chemical compounds and materials described herein are available from a number of sources, including Gelest Incorporated of Morrisville, Pa., USA, and Sigma-Aldrich Chemical Company, of St. Louis, Mo., USA.

Figure 2:
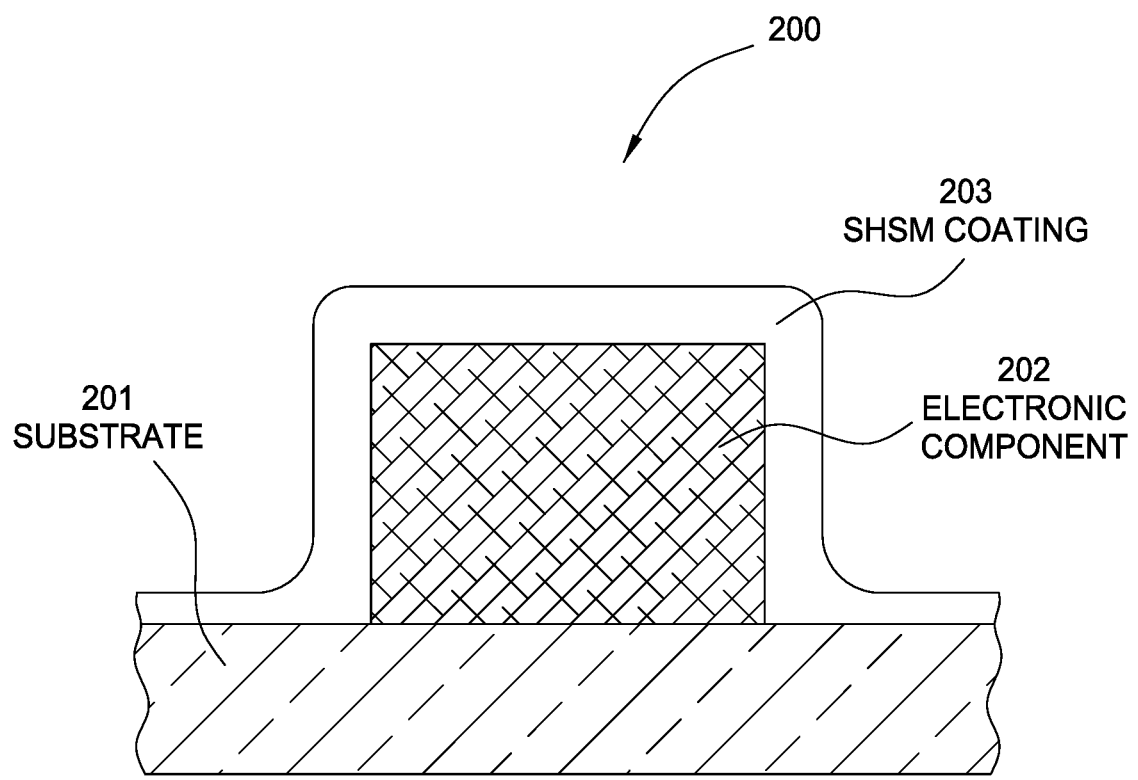
FIG. 2 is a cross-sectional drawing of an electronic component according to another embodiment.

In embodiments of this disclosure, the subsurface modified silica nanoparticles may be combined directly with a polymer and may serve as a filler for the polymer, and therefore modify the properties of the polymer. The resulting material may be known as an inorganic-organic nanocomposite. In one example, the SHSM nanoparticles may be combined with a polymer by dispersion or solvation with functional organic monomers in a polymerization reaction, and thus may be integrated into a solid polymer host matrix after cure. In this case, the silica particles may be dispersed in a solution of vinyl monomers, and the vinyl monomers may be polymerized by using a free radical polymerization technique. Alternatively, the SHSM may be physically mixed with a molten polymer using compounding techniques, or may be mixed with a polymer solution and then cast from a solvent to create a coating. In another example, SHSMs may be part of a polysiloxane nanocomposite in which the SHSM is covalently bonded to the polysiloxane and/or is a part of a physical mixture with the polysiloxane. Polysiloxanes are inorganic-organic polymers that have an inorganic silicon-oxygen backbone chain (—Si—O—Si—) with organic side groups attached to the four-coordinate silicon atoms, and may be represented by the chemical formula $[R_2SiO]_n$, where R is an organic group. The organic group may be aliphatic, aromatic, or both, and may further comprise other atoms and/or chemical functionalities that are inorganic. The method of crosslinking an SHSM or a nanocomposite containing an SHSM is not restricted in this disclosure, and may include a combination of multifunctional monomers and subsurface-modified silica nanoparticles that may serve as the foci for crosslinking. The SHSM may crosslink or copolymerize via surface functional groups that participate in the in situ polymerization or a post-polymerization treatment such as heat exposure. In some cases, the polymer host may be crosslinked to provide a coating that is suitable for protecting electronic articles from contaminant ingress and/or abrasion. The coatings may display enhanced gas and liquid barrier properties, increased modulus, and abrasion resistance, and improved adhesion to the surface of an electronic article. For example, an SHSM coating may be disposed over and upon an electronic article, such as a printed circuit board or other electronic article(s) that have circuitry and electronic components, such as integrated circuits, transistors, capacitors, resistors, wires, and the like. The coating may be applied to an electronic article by coating methods that are familiar to those skilled in the art, including: spray, brush, flow, dip, spin, and automated pattern coating. FIG. 2 is a cross-sectional drawing of such an electronic article 200, which includes a substrate 201, an electronic component 202, and a coating 203. In one embodiment, the percent by weight of silica particles in such a coating may be from about 0.1% to about 20% by weight, such as about 5% by weight, and by which may increase the Shore hardness and modulus of such a coating by as much as 25%.

Methods of making crosslinked particles or nanocomposites include: a) use of an excess of a multifunctional bridging organosilane compound (e.g., 1,2-bis(triethoxysilyl)hexane) during the particle synthesis, b) exposure of the particles to a similar reagent after synthesis to cause crosslinking, c) mixing of the particles with another functional material, reagent, binder, or polymer that causes the crosslinking, and d) a heat treatment to enable a crosslinking reaction. Reaction example 2 illustrates the crosslinking of silica particles with 1,2-bis(triethoxysilyl)hexane.

REACTION EXAMPLE 2

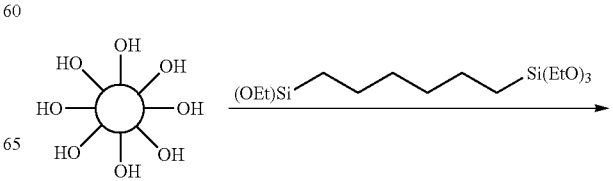

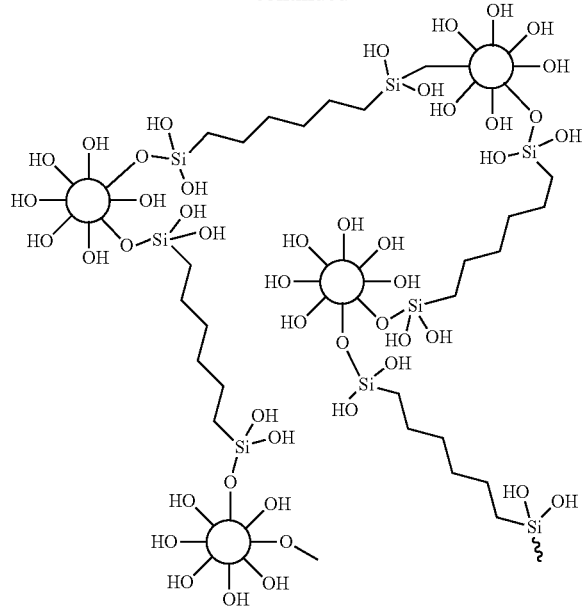

The particles in reaction example 2 may be crosslinked subsurface-modified silica nanoparticles, or unmodified silica particles. The particles shown in reaction example 2 contain unreacted silanol groups which may be anchored to or covalently bound directly to substrates or polymer hosts. In this case, the bridging compounds described herein may be used to link to the surface silanol groups, resulting in crosslinked silica particles, which may be unmodified, surface modified, sub-surface modified, or any mixture or combination thereof.

SHSM particles in a coating may serve as physical blocking sites that retard or slow contaminant gas ingress or permeation into and through a coating, and thus into an electronic article coated with the coating, by way of a tortuous path. Additionally, the solubility and diffusion factors governing permeation may be adjusted to enhance the barrier properties of the SHSM coatings by modifying or tuning the coating chemical polarity, density, and crosslink density. This may be partially achieved by changing the R groups of the SHSM and/or the groups comprising the coating. Coatings containing SHSMs may block or slow permeation of contaminant gases by two mechanisms: 1), chemical reaction and adduct formation when contacted with certain compounds such as sulfur compounds, and 2), slowing of gas permeation via a tortuous path. Gases permeate coatings by a solubility/diffusion mechanism, where the rate of gas permeation is directly proportional to the product of solubility of the gas where the flux of gas permeation is directly proportional to the product of solubility of the gas and the diffusion coefficient of the dissolved gas ($P=S \cdot D$). The permeability coefficient (P) is a parameter defined as the transport flux of a gas (rate of gas permeation per unit area), per unit driving force, per unit membrane thickness. Temperature also affects coating permeability at elevated temperature applications, such as those coatings used to protect electronic articles. The Arrhenius equation, $P=Po^*e^{(-E/RT)}$, where P is the permeability, Po is the permeability constant, E is the activation energy, R is the gas constant, and T is the temperature, relates temperature to permeability. Permeation rates of gases and permeation coefficients may be measured by a number of methods including coulometric (ASTM D 3895), manometric (ASTM D 1434), and carrier gas (ISO 15105-1). Instruments that measure permeation and permeation testing services are provided by companies such as Mocon Inc., of Minneapolis, Minn., USA.

In some embodiments, the R group of an SHSM may contain a group that may undergo a chemical reaction or an interaction with a diffusing chemical species (permeant) that diffuses into or penetrates into a coating containing the SHSM. Examples of reactive R groups and/or atoms include, but are not restricted to: unsaturated groups, carbonyl groups, amines, azo compounds, triazines, anhydrides, acetals, ketals, acrylates, amides, esters, epoxides, imides, amines, carbamates, halogens, metals, non-metals, quaternary ammonium compounds, salts, metal oxides, and main group elements and their oxides. In other embodiments, the R group may be chosen to allow passage of a certain permeant(s) through the material and block other permeants, therefore serving as a selective membrane or functional coating. Those skilled in the art may tune these properties by choice of R groups on the surface and in the subsurface. In further embodiments, coatings containing SHSMs may aid the diffusion of certain non-polar permeants. For example, an SHSM material may contain aromatic rings or groups which have an affinity for like-kind aromatic permeants and thus enable their passage and/or absorbance into the coating. In another embodiment, if the R groups are aromatic rings and/or other bulky structures, permeant diffusion may be slowed by local crystallite formation and other steric effects. In one embodiment, an SHSM coating containing reactive groups may be used to protect electronic articles from the corrosive effects of sulfur-containing compounds and gases by chemical reaction with the sulfur compound and formation of a non-volatile adduct. As mentioned prior, an SHSM may be used as a coating directly or combined with a polymer host or binder. FIG. 2 is a cross-sectional drawing of such an electronic article 200, which includes a substrate 201, an electronic component 202, and a coating 203 of a first thickness and a first composition, according to the coatings described herein, that may contain reactive groups that have not been exposed to or reacted with a sulfur compound.

Figure 3:
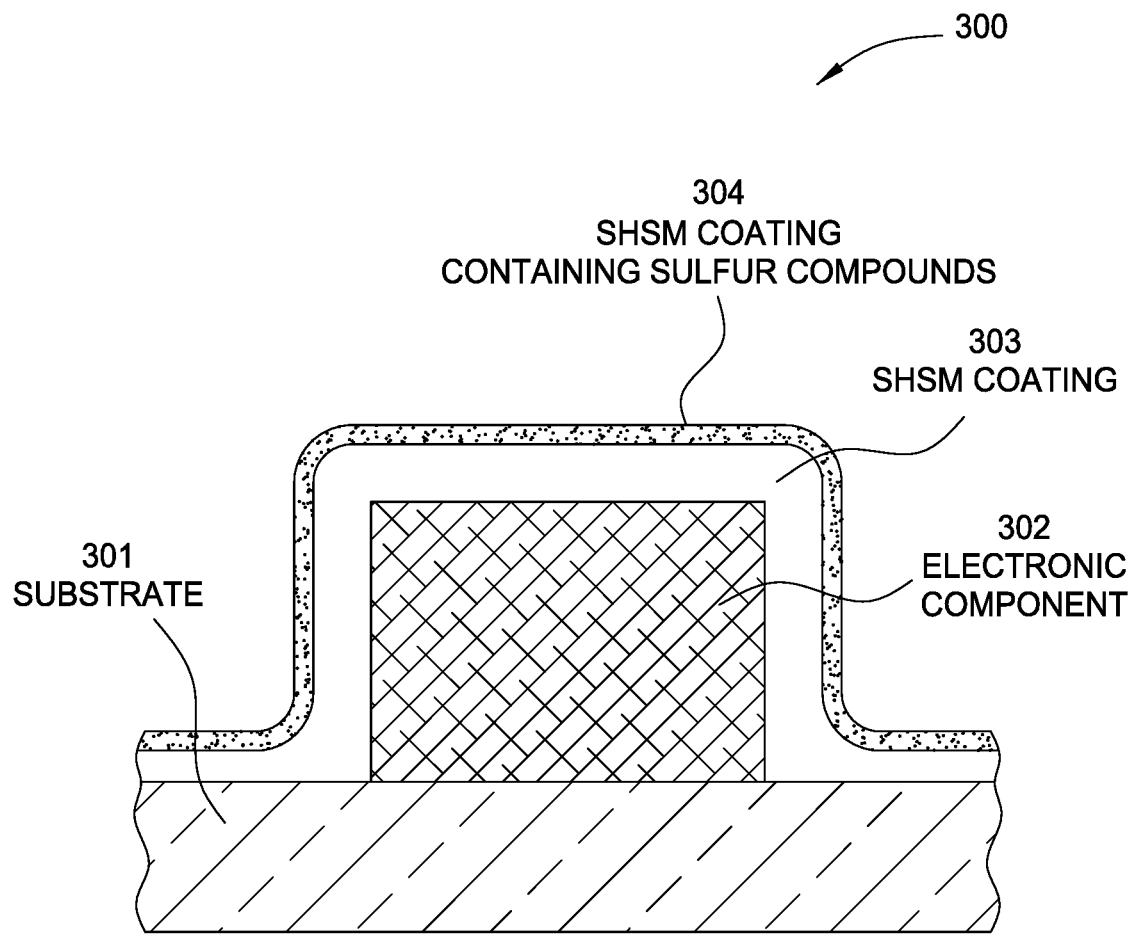
FIG. 3 is a cross-sectional drawing of an electronic component after exposure to a sulfur compound according to another embodiment.

FIG. 3 is a cross-sectional drawing of a similar electronic article 300, after exposure to a sulfur-bearing gas, which includes a substrate 301, an electronic component 302, an SHSM coating of a first thickness and a first composition 303 (303 may be unreacted 203), and a new layer 304, of a second thickness and a second composition. In summary, after exposure to a sulfur-containing gas, such as $H_2S$, the SHSM coating 303 may react with a sulfur compound or compounds, to form a surface or layer of a second thickness and a second composition, 304, that may contain sulfur adducts or reaction products. The second thickness and composition 304, may be of a thickness from about 1 nm to about 10 microns, depending on parameters such as permeant concentration, the time of exposure, and the permeability of the coating containing the reactive groups. In one embodiment, improved barrier properties are realized after initial exposure of an SHSM coating to a sulfur-containing compound or gas. This is because the coating may form a new passivating surface layer and composition that contains the chemical reaction adducts from contact of the SHSM groups with a sulfurous gas. The new passivated surface and composition, such as that represented by 304 in FIG. 3, disposed over and upon an underlying unreacted or partially reacted SHSM coating layer, such as that represented by 303 in FIG. 3, may have reduced solubility or affinity for contaminant gases, and thus a reduced entropy gradient for sulfurous gases to traverse through the coating.

Organic esters of silicic acid that may be used to perform the reactions herein include the lower alkyl esters of silicic acid. Alkyl groups that may be present in such esters include $C_1$ to $C_6$ linear, branched, cyclic, aromatic, and aliphatic groups. Such groups specifically include methyl, ethyl, propyl, butyl, pentyl, hexyl, isopropyl, isobutyl, t-butyl, isopentyl, t-pentyl, cyclopentyl, isohexyl, t-hexyl, cyclohexyl, and phenyl. Mixtures of alkyl groups may also be used. Additionally, mixtures of R groups may be used in an organosilane bridging compound to provide diversity in linkages in the silicon-oxygen matrix of a silica particle. The alkyl groups listed above may be added to an organosilane bridging compound by using different precursors, such as different alkoxysilanes, in reaction example 1. So long as at least one R group at each end of the organosilane bridging compound is hydrolyzable, the bridging compound may be used to link to a silicon-oxygen matrix at both ends of the bridging compound. It should be noted that different R groups may result in different reaction rates, both in hydrosilylation and in bridging, so the type of R group may be selected to control reaction rates in both reactions. Additionally, bulky R groups that may not undergo rapid linkage to the silicon-oxygen matrix may be left unlinked at one end to provide a dangling organosilicon substituent in the silicon-oxygen matrix.

While the foregoing is directed to embodiments of the present disclosure, other and further embodiments of the disclosure may be devised without departing from the basic scope thereof, and the scope thereof is determined by the claims that follow.

What is claimed is:

1. An electronic article, comprising:

a substrate comprising electronic components; and a coating disposed on the substrate that contains silica particles comprising subsurface organic groups, wherein at least two of the silica particles are bonded directly to a bridging compound having the structure $X_2Si—R—SiX_2$, wherein R is selected from the group consisting of polyurethanes, and polyethers, wherein the X groups are —OH groups.

2. The electronic article of claim 1, wherein the silica particles are nanoparticles.

3. The electronic article of claim 1, wherein a portion of the silica particles are foci for coating crosslinks.

4. The electronic article of claim 1, wherein a concentration of the silica particles in the coating is from 0.01 wt % to 5 wt %.

5. The electronic article of claim 1, wherein the coating has a thickness of from 1 nm to 10 microns.

6. The electronic article of claim 1, wherein the coating is a selective permeant barrier coating.

7. The electronic article of claim 6, wherein the coating forms a reaction product with a permeant.

8. The electronic article of claim 1, wherein the coating forms a reaction product with a sulfur compound.

9. The electronic article of claim 8, wherein the sulfur compound is selected from the group consisting of elemental sulfur, inorganic sulfur compounds, hydrogen sulfides, sulfur oxides, organic sulfur compounds, thiols, and alkane thiols.

10. An electronic article, comprising:

a substrate comprising electronic components; and a coating disposed on the substrate that contains silica particles comprising subsurface organic groups, wherein the silica particles have a diameter of from 1 nm to 100 nm, wherein at least two of the silica particles are bonded directly to a bridging compound having the structure $X_2Si—R—SiX_2$, wherein R is selected from the group consisting of polyurethanes, and polyethers, and wherein the X groups are —OH groups.

11. The electronic article of claim 10, wherein a portion of the silica particles are foci for coating crosslinks.

12. The electronic article of claim 10, wherein a concentration of the silica particles in the coating is from 0.01 wt % to 5 wt %.

13. The electronic article of claim 10, wherein the coating has a thickness of from 1 nm to 10 microns.

14. An electronic article, comprising:

a substrate comprising electronic components; and a coating disposed on the substrate that contains silica particles comprising subsurface organic groups, wherein the silica particles are nanoparticles having a diameter of from 1 nm to 100 nm, and wherein at least two of the silica particles are bonded directly to the same bridging compound having the structure $R_2Si$ $SiR_2$, wherein the R groups are —OH groups.

15. The electronic article of claim 14, wherein a concentration of the silica particles in the coating is from 0.01 wt % to 5 wt %.

16. The electronic article of claim 14, wherein the coating has a thickness of from 1 nm to 10 microns.

* * * * *